US008819470B2

(12) United States Patent
Takahashi (10) Patent No.: US 8,819,470 B2
(45) Date of Patent: Aug. 26, 2014

(54) SWITCHING DEVICE, A SWITCHING DEVICE CONTROL METHOD AND A SWITCHING DEVICE CONTROL PROGRAM

(75) Inventor: Daiki Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 205 days.

(21) Appl. No.: 13/290,614

(22) Filed: Nov. 7, 2011

(65) Prior Publication Data

US 2012/0117408 A1 May 10, 2012

(30) Foreign Application Priority Data

Nov. 9, 2010 (JP) ................................. 2010-250717

(51) Int. Cl.
*G06F 1/26* (2006.01)
*G06F 1/30* (2006.01)

(52) U.S. Cl.
USPC ........................................... 713/330; 713/340

(58) Field of Classification Search
USPC ......................................................... 713/330
See application file for complete search history.

(56) References Cited

U.S. PATENT DOCUMENTS

| | | | |
|---|---|---|---|
| 6,191,500 B1* | 2/2001 | Toy | 307/64 |
| 6,292,379 B1* | 9/2001 | Edevold et al. | 363/71 |
| 6,605,879 B2* | 8/2003 | Wade et al. | 307/66 |
| 7,061,141 B2* | 6/2006 | Yamamoto | 307/65 |
| 7,265,458 B2* | 9/2007 | Edelen et al. | 307/65 |
| 7,888,816 B2* | 2/2011 | Zajkowski | 307/64 |
| 8,212,404 B2* | 7/2012 | Zajkowski | 307/64 |
| 8,519,567 B2* | 8/2013 | Zajkowski | 307/64 |
| 2009/0033154 A1* | 2/2009 | Linkhart et al. | 307/65 |
| 2009/0058187 A1* | 3/2009 | Chang | 307/66 |
| 2011/0191612 A1* | 8/2011 | Itakura et al. | 713/320 |
| 2012/0116601 A1* | 5/2012 | Yano | 700/292 |
| 2013/0119768 A1* | 5/2013 | Chang | 307/66 |

FOREIGN PATENT DOCUMENTS

| | | |
|---|---|---|
| JP | 5-64376 A | 3/1993 |
| JP | 3153603 U | 9/2009 |

OTHER PUBLICATIONS

Tanenbaum, Andrew S.; "Structured Computer Organization"; Prentice-Hall, Inc.; 1990; Third Edition; pp. 11-13.*

* cited by examiner

*Primary Examiner* — Ryan Stiglic
(74) *Attorney, Agent, or Firm* — Sughrue Mion, PLLC (57) ABSTRACT

A switching device is comprising connectors and switching part, which is connected via the connectors to a working power supply unit, a redundant power supply unit, a battery unit and a power supply output terminal, and, in an initial state, connects the power supply output terminal and the working power supply unit, and connects the battery unit and the redundant power supply unit is connected, and in a spare state, cuts a connection between the battery unit and the redundant power supply unit, and connects the power supply output terminal and the redundant power supply unit.

9 Claims, 12 Drawing Sheets

SWITCHING DEVICE, A SWITCHING DEVICE CONTROL METHOD AND A SWITCHING DEVICE CONTROL PROGRAM

This application is based upon and claims the benefit of priority from Japanese Patent Application No. 2010-250717, filed on Nov. 9, 2010, the disclosure of which is incorporated herein in its entirety by reference.

TECHNICAL FIELD

The present invention relates to a switching device, a switching device control method and a switching device control program which switch a connection target of a plurality of inputs and in particular, relates to a switching device, a switching device control method and a switching device control program which switch connection relationship among a plurality of power supply units, loads and battery units.

BACKGROUND ART

In an important system such as a server, a power supply device equipped with a redundant power supply unit or a battery unit which can perform electric power supply at the time of power failure is used in order to raise reliability. A redundant power supply unit is a power supply unit which supplies electric power instead of a working power supply unit in case abnormality has occurred in the working power supply unit which supplies electric power at the time of normal operation.

In patent document 1, a power supply device which supplies power supply to a computer including a battery module to supply electric power to a main power supply line at the time of occurrence of power failure is disclosed. When power failure is not occurred, the power supply device described in patent document 1 charges the battery module by a standby power generation unit which supplies electric power for power supply management to the system at all times including a time when electric power is powered off. Also, when power failure occurs, the power supply device described in patent document 1 supplies electric power from the charged battery module.

In patent document 2, a battery charging method for charging a battery by a charger connected in parallel to the battery is disclosed. The battery charging method described in patent document 2 makes an electric power detector monitor load power of charging of a battery, makes a sequencer calculate a minimal number of chargers necessary to supply the load power, makes calculated number of chargers operate, and charges the battery.

PRECEDING TECHNICAL LITERATURE

Patent Document

[Patent document 1] Japanese Utility Model Registration No. 3153603
[Patent document 2] Japanese Patent Application Laid-Open No. 1993-064376

SUMMARY

The object of the present invention is to provide a switching device which solves the problem mentioned below.

The power supply device of patent document 1 does not include a redundant power supply module which can be switched from a working power supply module and supply electric power. Accordingly, while the working power supply module is normally operating, it is not possible to charge the battery module using electric power of the redundant power supply module to be supplied in case abnormality has occurred in the working power supply module.

The battery charging method of patent document 2 is a method for charging a battery with a minimal charger necessary. Accordingly, while the working power supply unit is normally operating, it is not possible to charge the battery using electric power of the redundant power supply unit to be supplied in case abnormality has occurred in the working power supply unit.

Means for Solving the Problems

A switching device is comprising connectors and switching part, which is connected via the connectors to a working power supply unit, a redundant power supply unit, a battery unit and a power supply output terminal, and, in an initial state, connects the power supply output terminal and the working power supply unit, and connects the battery unit and the redundant power supply unit is connected, and in a spare state, cuts a connection between the battery unit and the redundant power supply unit, and connects the power supply output terminal and the redundant power supply unit.

EFFECT OF THE INVENTION

The present invention has the effect that, while a working power supply unit is normally operating, it is possible to charge a battery unit using electric power of a redundant power supply unit to be supplied in case abnormality has occurred in the working power supply unit.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, the first embodiment of the present invention will be described in detail with reference to drawings.

Figure 1:
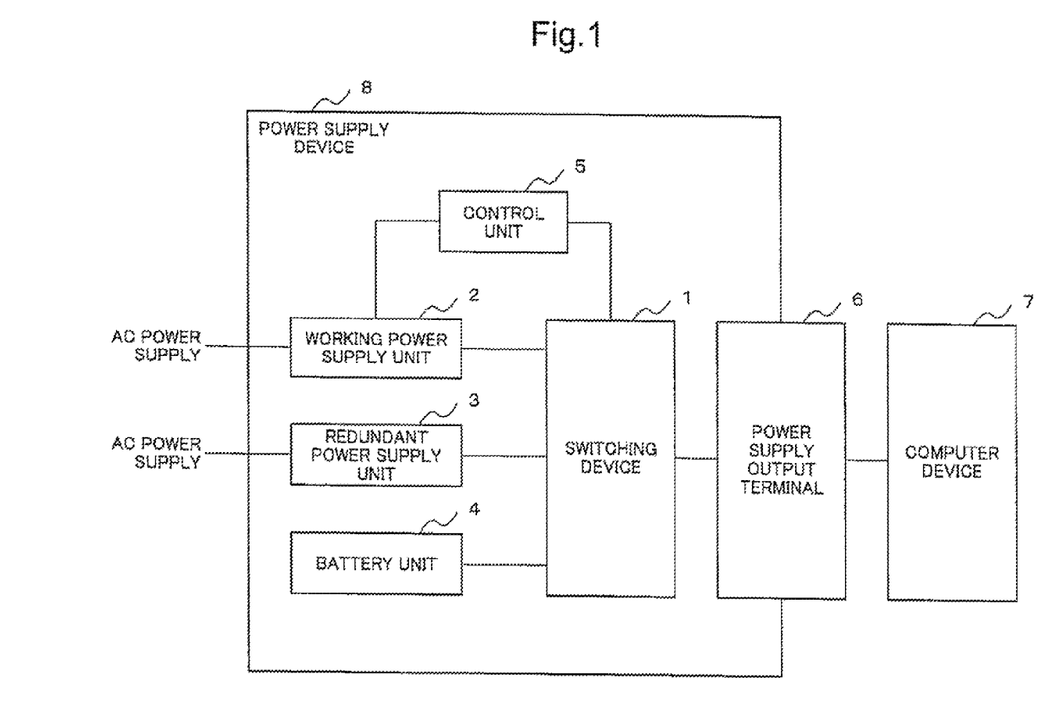
FIG. 1 is a block diagram illustrating a whole structure of the first exemplary embodiment.

FIG. 1 is a block diagram illustrating a computer system of this exemplary embodiment.

Referring to FIG. 1, the computer system of this exemplary embodiment includes a power supply device and a computer device 7.

The power supply device includes a switching device 1, a working power supply unit 2, a redundant power supply unit 3, a battery unit 4, a control unit 5 and a power supply output terminal 6. The computer device 7 is connected to the power supply output terminal 6 of the power supply device. The power supply device supplies electric power to the computer device 7.

Although the working power supply unit 2 and the redundant power supply unit 3 are indicated one each respectively in FIG. 1, a plurality of working power supply units 2 and redundant power supply units 3 may exist respectively. Although one battery unit 4 is indicated in FIG. 1 similarly, a plurality of them may exist. However, in the following, it is supposed that the working power supply unit 2, the redundant power supply unit 3 and the battery unit 4 exist one each respectively, and description will be made.

The working power supply unit 2 is connected to AC (alternating current) power supply, the switching device 1 and the control unit 5. The working power supply unit 2 supplies electric power to the computer device 7 via the switching device 1 and the power supply output terminal 6 at the time of normal operation.

The redundant power supply unit 3 is connected to AC power supply and the switching device I. In case abnormality occurs in the working power supply unit 2, the redundant power supply unit 3 supplies electric power to the computer device 7 instead of the working power supply unit 2 via the switching device 1 and the power supply output terminal 6. In case the working power supply unit 2 is operating normally, the redundant power supply unit 3 does not need to supply electric power to the computer device 7.

The battery unit 4 is connected to the switching device 1. The battery unit 4 is a storage battery which supplies electric power to the computer device 7 instead of the working power supply unit 2 and the redundant power supply unit 3 at the time of power failure, for example, when AC power supply is cut off. When the battery unit 4 is connected to the redundant power supply unit 3 via the switching device 1, the battery unit 4 is charged. When output voltage of the redundant power supply unit 3 and charging voltage of the battery unit 4 are different, equipment which adjusts voltage so that the output voltage of the redundant power supply unit 3 will becomes the charging voltage of the battery unit 4 may be connected between the switching device 1 and the battery unit 4.

The switching device 1 is connected to the working power supply unit 2, the redundant power supply unit 3, the battery unit 4, the control unit 5 and the power supply output terminal 6. The switching device 1 switches from (or to) the state where the working power supply unit 2 and the power supply output terminal 6 are connected, and the redundant power supply unit 3 and the battery unit 4 are connected; to (or from) the state where a connection between the working power supply unit 2 and the power supply output terminal 6 is cut and the redundant power supply unit 3 and power supply output terminal 6 are connected. In the following description, a state where the working power supply unit 2 and the power supply output terminal 6 are connected, and the redundant power supply unit 3 and the battery unit 4 are connected respectively is an initial state. Also, a state where the connection between the working power supply unit 2 and the power supply output terminal 6 is cut and the redundant power supply unit 3 and the power supply output terminal 6 are connected is a spare state. The control unit 5 mentioned below will controls switching between the initial state and the spare state. In the initial state, the redundant power supply unit 3 charges the battery unit 4.

Figure 12:
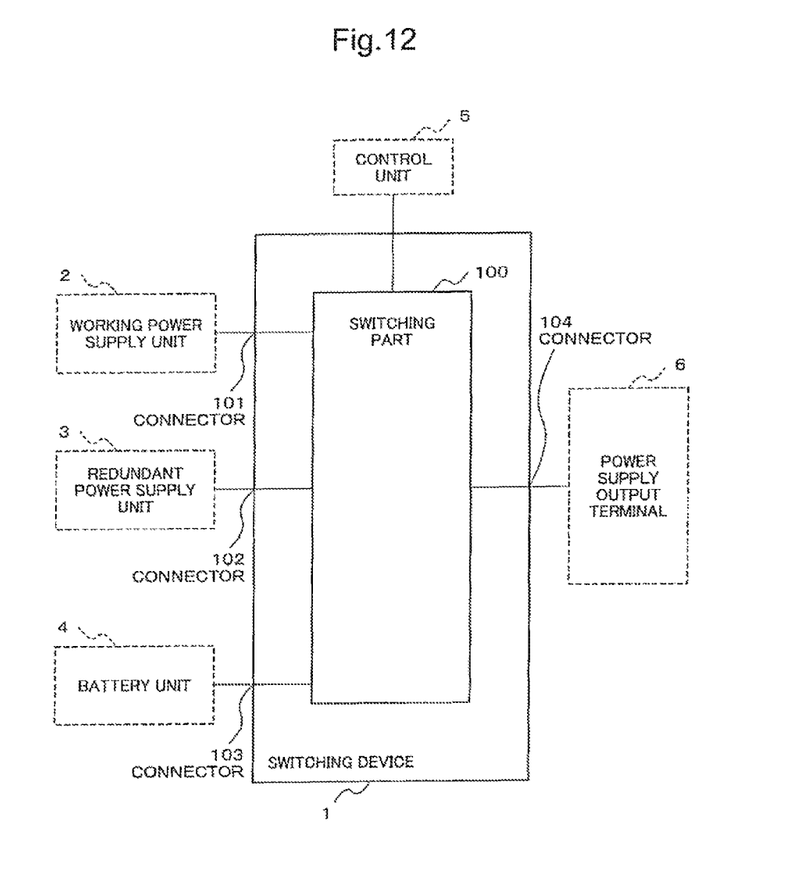
FIG. 12 is a block diagram illustrating a structure of a switching device 1.

FIG. 12 is a block diagram illustrating a structure of the switching device 1. Referring to FIG. 12, switching device 1 includes a switching part 100 and connectors (from a connector 101 through a connector 104). The switching part 100 is connected via the connectors to the working power supply unit 2, the redundant power supply unit 3, the battery unit 4 and the power supply output terminal 6.

In the examples of the switching device 1 illustrated in FIG. 3, FIG. 4, FIG. 5, FIG. 6, FIG. 10, and FIG. 11, which are described below, the switching part 100 includes the switches and the selector switches of these figures.

The control unit 5 is connected to the working power supply unit 2 and the switching device 1. The control unit 5 detects abnormality of the working power supply unit 2, for example, by measuring and so on output voltage of the working power supply unit 2 by a voltmeter. In case the control unit 5 detects abnormality of the working power supply unit 2, the control unit 5 controls the switching device 1 and switches it from the initial state to the spare state.

Next, operation of this exemplary embodiment will be described in detail with reference to drawings.

Figure 2:
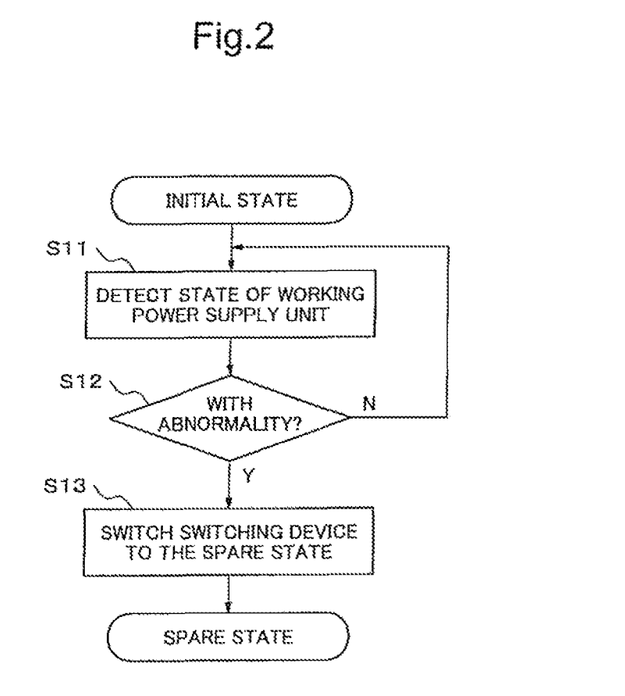
FIG. 2 is a flow chart illustrating operation of the first exemplary embodiment.

FIG. 2 is a flow chart illustrating operation of this exemplary embodiment.

Referring to FIG. 2, a computer system of this exemplary embodiment starts operation in the initial state in which the working power supply unit 2 and the power supply output terminal 6 are connected and the redundant power supply unit 3 and the battery unit 4 are connected in the switching device 1. In the initial state, the working power supply unit 2 supplies electric power to the computer device 7 via the switching device 1 and the power supply output terminal 6. Also, in the initial state, the redundant power supply unit supplies electric power to the battery unit 4 via the switching device 1 and charges the battery unit 4.

The control unit 5 measures output voltage of the working power supply unit 2, for example, by a voltmeter and detects abnormality of the working power supply unit 2 (Step S11). The control unit 5 may detect abnormality of the working power supply unit 2, for example, in case a difference between the measured value of the output voltage of the working power supply unit 2 and the designed output voltage exceeds a predetermined value, or a fluctuation per unit time of the measured value of the output voltage of the working power supply unit 2 exceeds a predetermined value. Further, a detection method of abnormality of the working power supply unit 2 by the control unit 5 is not limited to these examples.

In case the control unit 5 does not detect abnormality of the working power supply unit 2 (Step S12, N), the control unit 5 continues the initial state and processing returns to Step S11.

In case the control unit 5 detects abnormality of the working power supply unit 2 (Step S12, Y), the control unit 5 controls the switching device 1 and switches it from the initial state to the spare state (Step S13). The control unit 5 controls switching of the switching device 1 from the initial state to the spare state, for example, by transmitting a signal to the switching device 1 to switch from the initial state to the spare state. In this case, when the switching device 1 receives the signal requesting to switch from the initial state to the spare state from the control unit 5, it switches its own state from the initial state to the spare state. In the spare state, the control unit 5 may a connection between the redundant power supply unit 3 and the battery unit 4. Further, when the redundant power supply unit 3 can supply sufficiently large electric power, it is also possible in the spare state to connect the redundant power supply unit 3 to the power supply output terminal 6 and, at the same time, connect the redundant power supply unit 3 to the battery unit 4 also. Also, although not shown, the control unit 5 can be made so that, in case charging of the battery unit 4 has been completed, it receives a notification of completion of charging from the battery unit 4, and controls the switching device 1 to cut off electric power supply from the battery unit 4. Also, the battery unit 4 can be made so that, in case it detects completion of charging of its own, it cuts off electric power supplied via the switching device 1.

The switching device 1 which switches its own state from the initial state to the spare state based on the signal from the control unit 5 can be realized, for example, by a logic circuit. Also, the switching device 1 can also be realized by a plurality of switches which can be controlled by the control unit 5.

Figure 3:
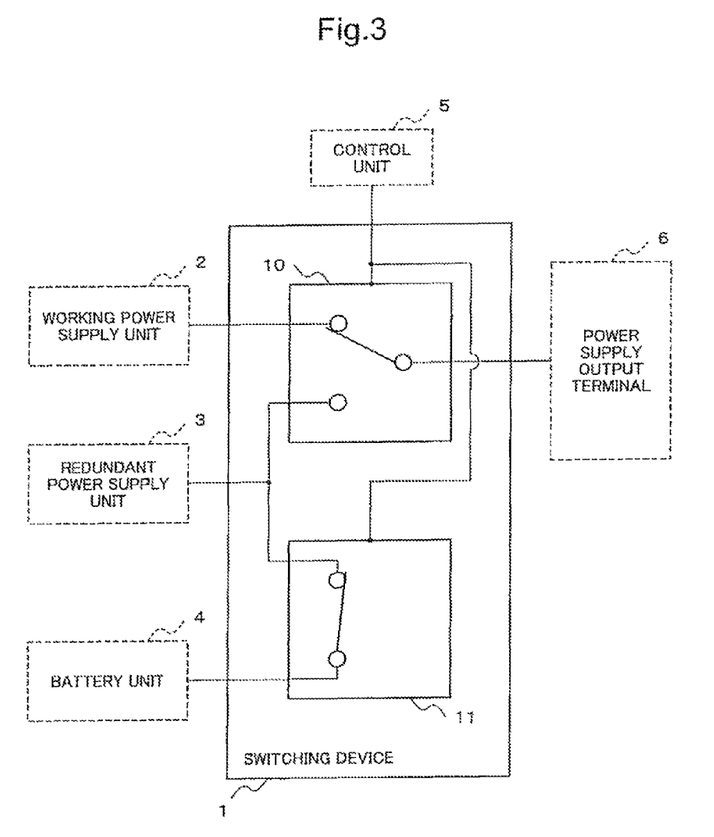
FIG. 3 is a figure illustrating an example of a switching device 1 in an initial state (ex. 1)
Figure 4:
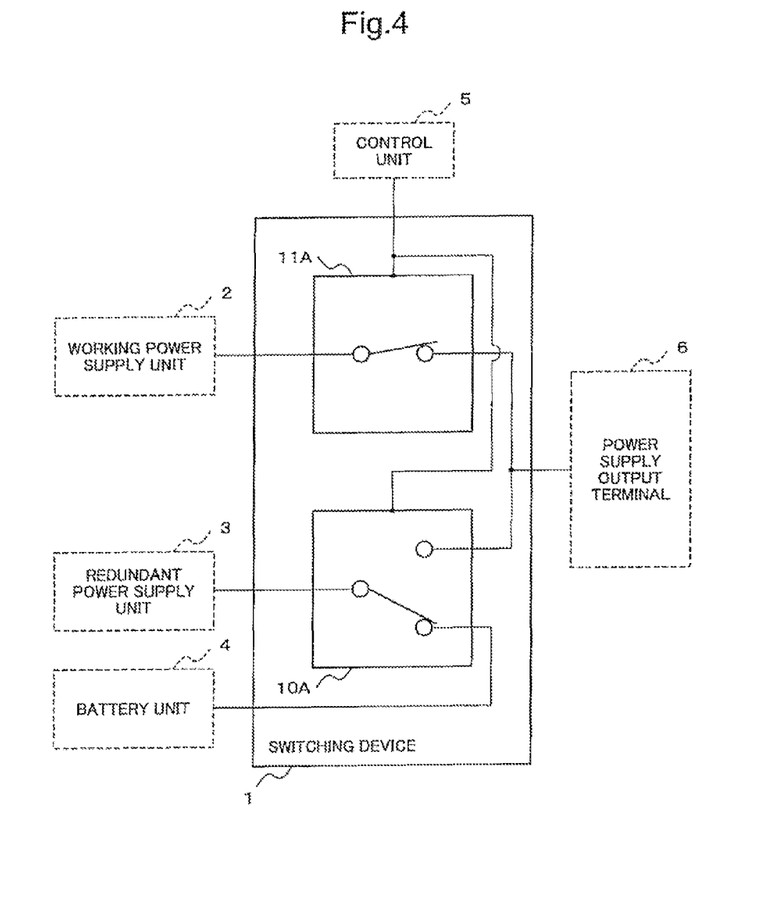
FIG. 4 is a figure illustrating an example of a switching device 1 in an initial state (ex. 2)

FIG. 3 and FIG. 4 are exemplary configurations of the switching device 1 realized by a switch and a selector switch which can be controlled by the control unit 5. FIG. 3 and FIG. 4 represent the initial state.

A switch includes two terminals and controls a connection between the two terminals, each of which is connected with a device, such as a power supply unit, a battery unit, and a power supply output terminal, and a like. And, a selector switch connects a terminal selected from two terminals with a terminal other than the two terminals. Each of these three terminals is included in the selector switch, and is connected with a device, too. In the following description, a switch which controls the connection between two terminals each of which is connected with a device is described as a switch which controls the connection between the two devices, each of which is connected with one of the terminals respectively. And, a selector switch which connects either of two terminals with a terminal other than the two terminals is described as a selector switch which connects either of two devices, each of which is connected with one of the two terminals respectively, with a device, which is connected with the terminal other than the two terminals.

The switching device 1 of the example of FIG. 3 is connected to the control unit 5 and includes a selector switch 10 and a switch 11 which can be controlled by the control unit 5. The elector switch 10 connects either of the working power supply unit 2 and the redundant power supply unit 3 with the power supply output terminal 6. The switch 11 controls a connection between the redundant power supply unit 3 and the battery unit 4. In the initial state, by the selector switch 10, the working power supply unit 2 and the power supply output terminal 6 are connected and a connection between the redundant power supply unit 3 and the power supply output terminal 6 is cut. Also, by the switch 11, the redundant power supply unit 3 and the battery unit 4 are connected.

The switching device 1 of the example of FIG. 4 is connected to the control unit 5 and includes a selector switch 10A and a switch 11A which can be controlled by the control unit 5. The switch 11A controls a connection between the working power supply unit 2 and the power supply output terminal 6. The selector switch 10A connects the redundant power supply unit 3 with either of the power supply output terminal 6 or the battery unit 4. In the initial state, by the switch 11A, the working power supply unit 2 and the power supply output terminal 6 are connected. Also, by the selector switch 10A, a connection between the redundant power supply unit 3 and the power supply output terminal 6 is cut, and the redundant power supply unit 3 and the battery unit 4 are connected.

Figure 5:
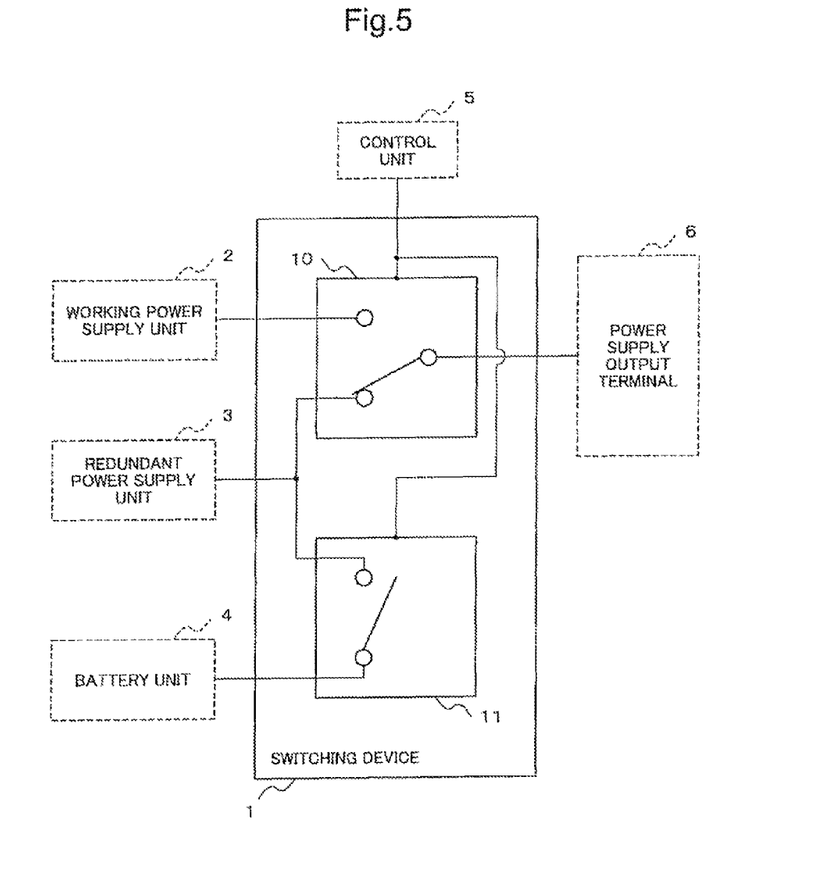
FIG. 5 is a figure illustrating an example of a switching device 1 in a spare state (ex. 1)

FIG. 5 is a figure illustrating the spare state of the switching device 11 whose example is shown in FIG. 3. The state of the selector switch 10 and the switch 11 in FIG. 5 is opposite to FIG. 3.

Figure 6:
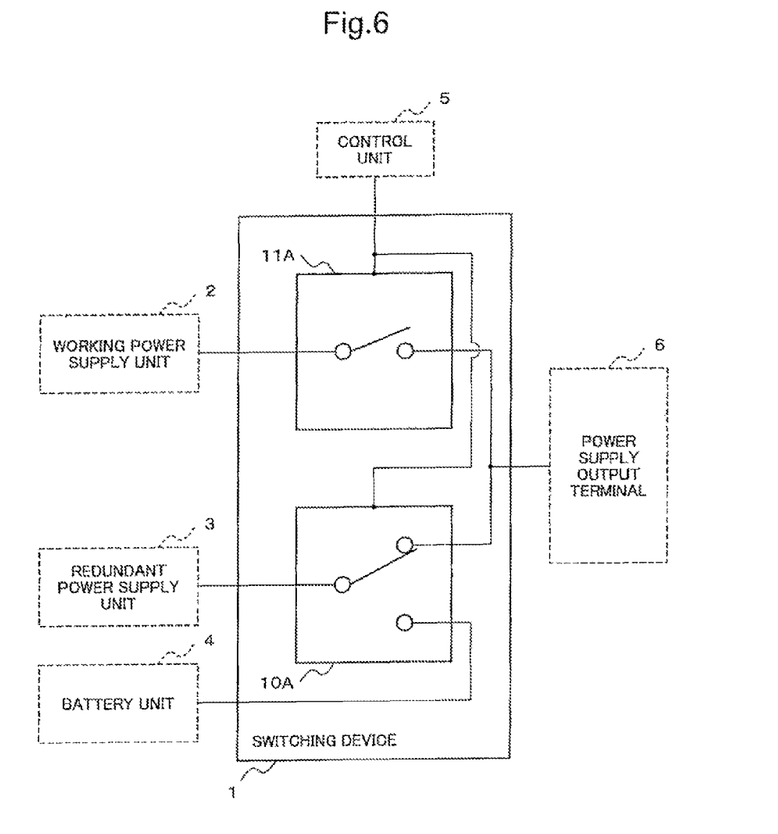
FIG. 6 is a figure illustrating an example of a switching device 1 in a spare state (ex. 2)

FIG. 6 is a figure illustrating the spare state of the switching device 1 whose example is shown in FIG. 4. The state of the selector switch 10A and the switch 11A in FIG. 6 is opposite to FIG. 4.

Also, the switching device 1 can be realized by switches whose number is the number of the power supply units plus 1.

Figure 7:
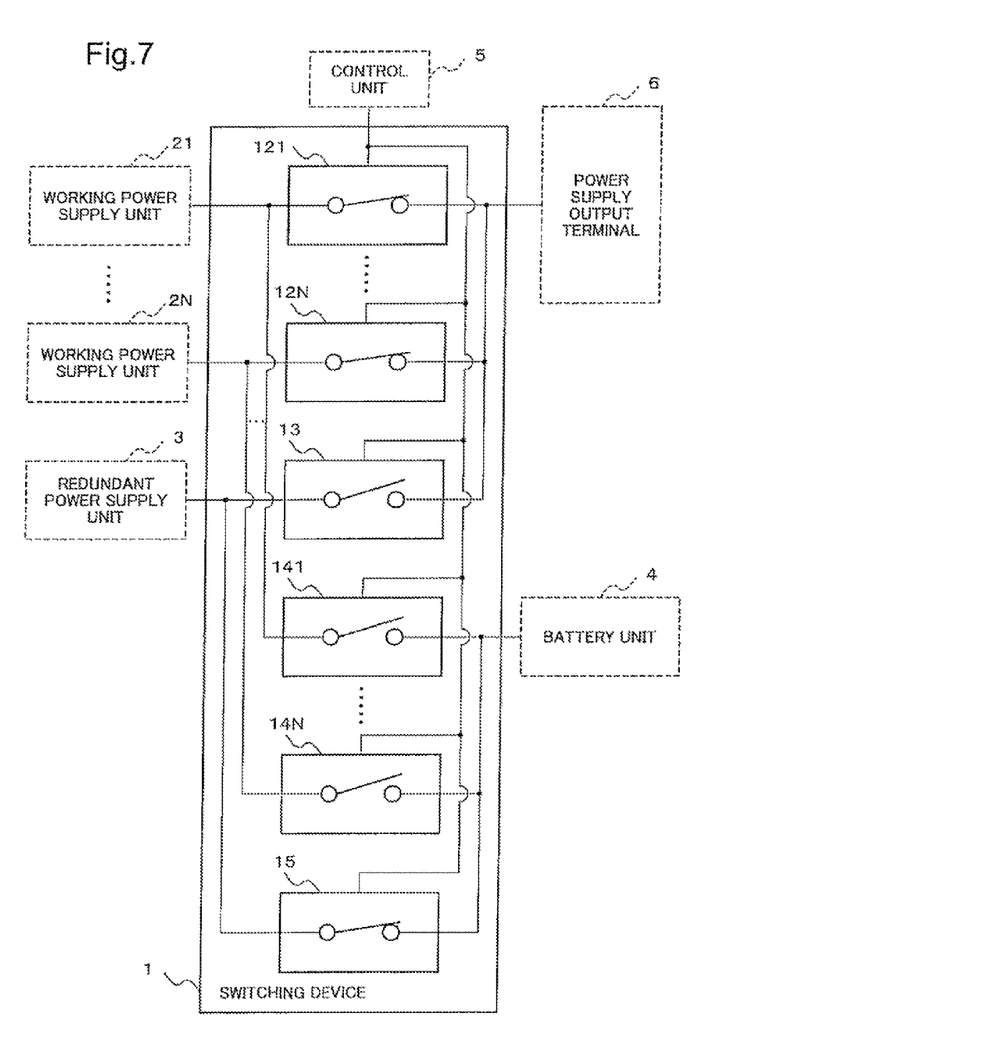
FIG. 7 is a figure illustrating an example of a switching device 1 in an initial state (ex. 3)

FIG. 7 is a figure illustrating an example of a structure of the switching device 1 in the power supply device including N+1 power supply units, including the redundant power supply unit 3 and N working power supply units which are from the working power supply unit 21 through the working power supply unit 2N (working power supply units 21-2N).

The switching device 1 of the example of FIG. 7 includes a switch 13 and switches which are from switch 121 through switch 12N (switches 121-12N), each of which controls a connection between each of the power supply units, which are the redundant power supply unit 3 and the working power supply units 21-2N, and the power supply output terminal 6 respectively. Also, the switching device 1 of the example of FIG. 7 includes a switch 15 which controls a connection between the redundant power supply unit 3 and the battery unit 4. Also, the control unit 5 detects abnormality of the working power supply units 21-2N, and controls all the switches.

FIG. 7 represents an initial state of the switching device 1. In the initial state, each of the working power supply units 21-2N and the power supply output terminal 6 are connected by the switches 121-12N respectively. Also, by the switch 13, a connection between the redundant power supply unit 3 and the power supply output terminal 6 is cut. Further, by the switch 15, the redundant power supply unit 3 and the battery unit 4 are connected.

In the example of FIG. 7, when the control unit 5 detects abnormality in either of the working power supply units 21-2N, the control unit 5 switches the switching device 1 from the initial state to the spare state. The control unit 5 carries out switching from the initial state to the spare state as follows. The control unit 5 controls the switch, among the switches 121-12N, which corresponds to the working power supply unit in which abnormality is detected and cut a connection between the working power supply unit in which abnormality is detected and the power supply output terminal 6. Also, the control unit 5 connects the redundant power supply unit 3 and the power supply output terminal 6 by controlling the switch 13, and cut a connection between the redundant power supply unit 3 and the battery unit 4 by controlling the switch 15.

Although the switching device 1 of the example of FIG. 7 includes N working power supply units which are the working power supply units 21-2N, and one redundant power supply unit which is the redundant power supply unit 3, the number of the working power supply units and the redundant power supply units are not limited to this, and a plurality of redundant power supply units may be included.

Also, the switching device 1 may include, for example, switches each of which controls a connection between each power supply unit and the battery unit 4 (switches 141-14N, each of which controls a connection between each of the working power supply units 21-2N and the battery unit 4, and the switch 15). With the structure described above, any power supply unit can be a redundant power supply unit, and charging of the battery unit 4 by the redundant power supply unit becomes possible.

This exemplary embodiment described above has the effect that, while a working power supply unit is operating normally, it is possible to charge the battery unit 4 using electric power of a redundant power supply unit which supplies electric power in case abnormality has occurred in the working power supply unit.

It is because the switching device 1 of this exemplary embodiment can be switched between the initial state and the spare state. As mentioned above, the initial state of this exemplary embodiment is the state where the working power supply unit 2 and the power supply output terminal 6 are connected, and the redundant power supply unit 3 and the battery unit 4 are connected. Also, the spare state is the state where the redundant power supply unit 3 and the power supply output terminal 6 are connected, and the connection between the working power supply unit 2 and the power supply output terminal 6 is cut.

Also, this exemplary embodiment has the effect that it can charge the battery unit 4 quickly.

The reason is that, in the initial state, the target of electric power supply of the redundant power supply unit 3 is the battery unit 4 only.

Next, the second exemplary embodiment of the present invention will be described in detail with reference to drawings.

Figure 8:
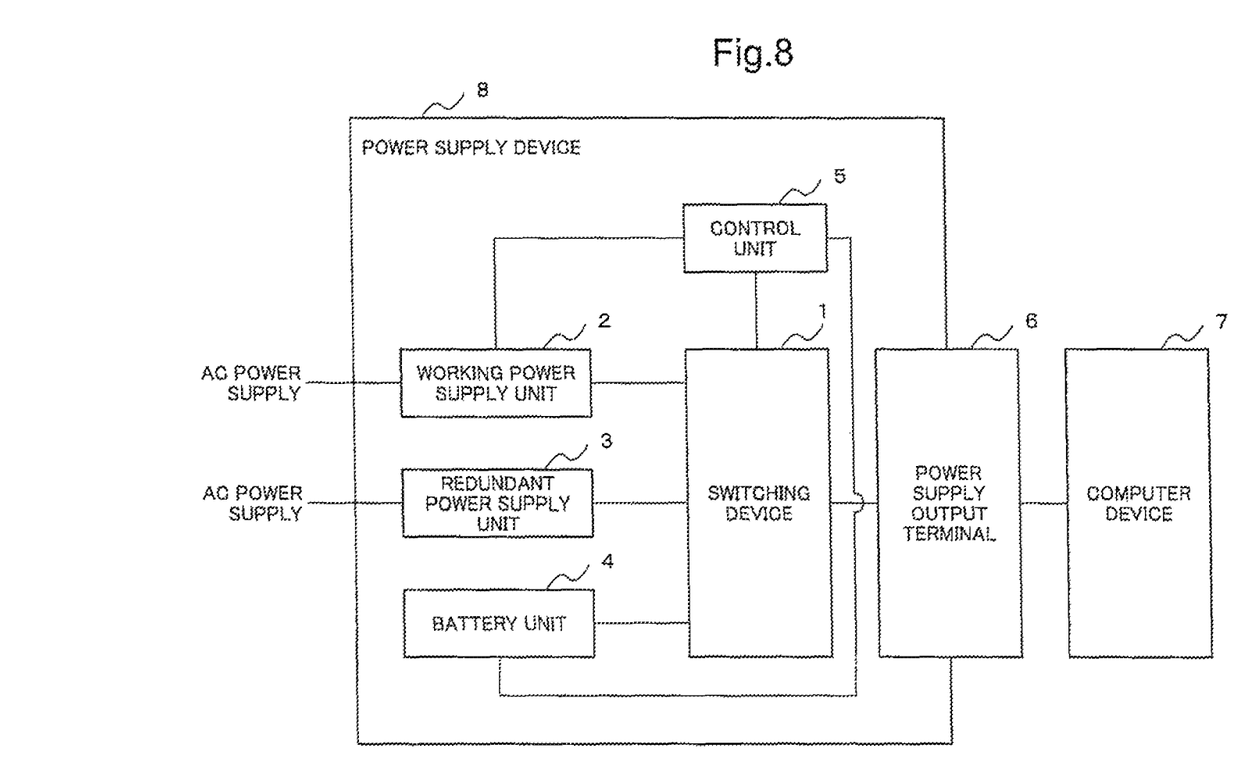
FIG. 8 is a block diagram illustrating a whole structure of the second exemplary embodiment.

FIG. 8 is a block diagram illustrating a structure of this exemplary embodiment.

When FIG. 8 and FIG. 1 illustrating a structure of the first exemplary embodiment are compared, they are different only on one point. While the battery unit 4 and the control unit 5 are connected in FIG. 8, they are not connected in FIG. 1. Because other components are same as the components of the first exemplary embodiment, their description will be omitted.

The battery unit 4 of this exemplary embodiment detects charge completion of its own when charging is completed, and transmits a notification of charge completion to the control unit 5.

When the notification of charge completion is received from the battery unit 4, the control unit 5 controls the switching device 1 and cuts off supply of electric power from the battery unit 4.

Next, operation of this exemplary embodiment will be described in detail with reference to drawings.

Figure 9:
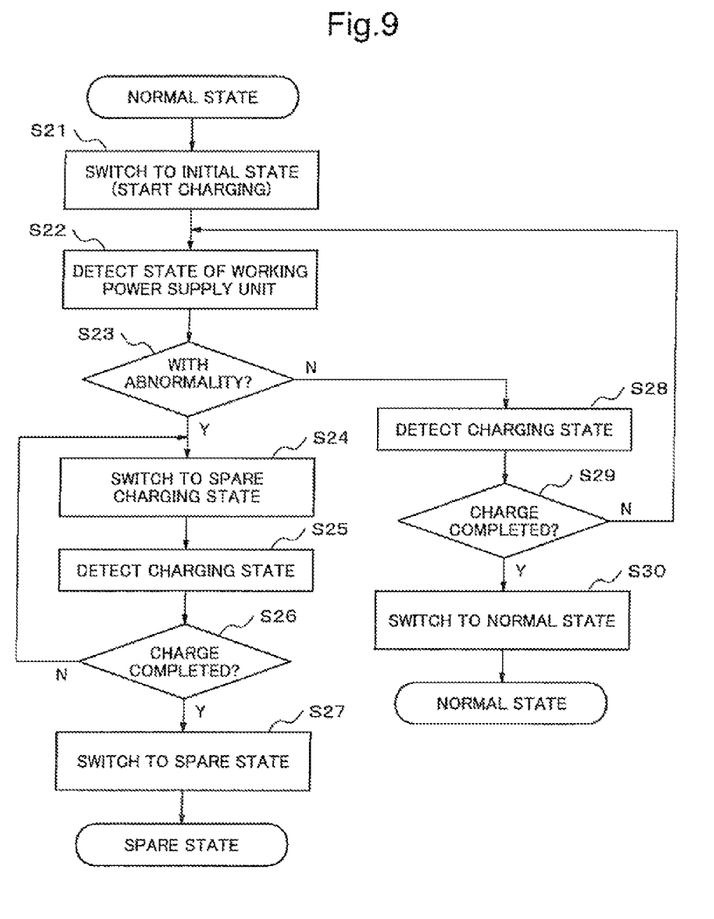
FIG. 9 is a flow chart illustrating operation of the second exemplary embodiment.

FIG. 9 is a flow chart illustrating operation of this exemplary embodiment.

Referring to FIG. 9, the switching device 1 which the power supply device of a computer system according to this exemplary embodiment includes is switched by control of the control unit 5 from a normal state to an initial state (Step S21).

The normal state of this exemplary embodiment is the state where the working power supply unit 2 and the power supply output terminal 6 are connected; and a connection between the redundant power supply unit 3 and the power supply output terminal 6 is cut, and a connection between the redundant power supply unit 3 and the battery unit 4 is cut. The initial state is same as the initial state of the first exemplary embodiment. Also, the control unit 5 may, for example, detect amount of charge of the battery unit 4, and when the detected amount of charge falls below a predetermined value, may switch the state of the switching device 1 from the normal state to the initial state. Or, the control unit 5 may, in case a notification of insufficient amount of charge is received from the battery unit 4, switch the state of the switching device 1 from the normal state to the initial state. In this case, the battery unit 4 detects amount of charge of its own, and when the detected amount of charge falls below a predetermined value, may notify the control unit 5 of insufficient amount of charge.

Figure 10:
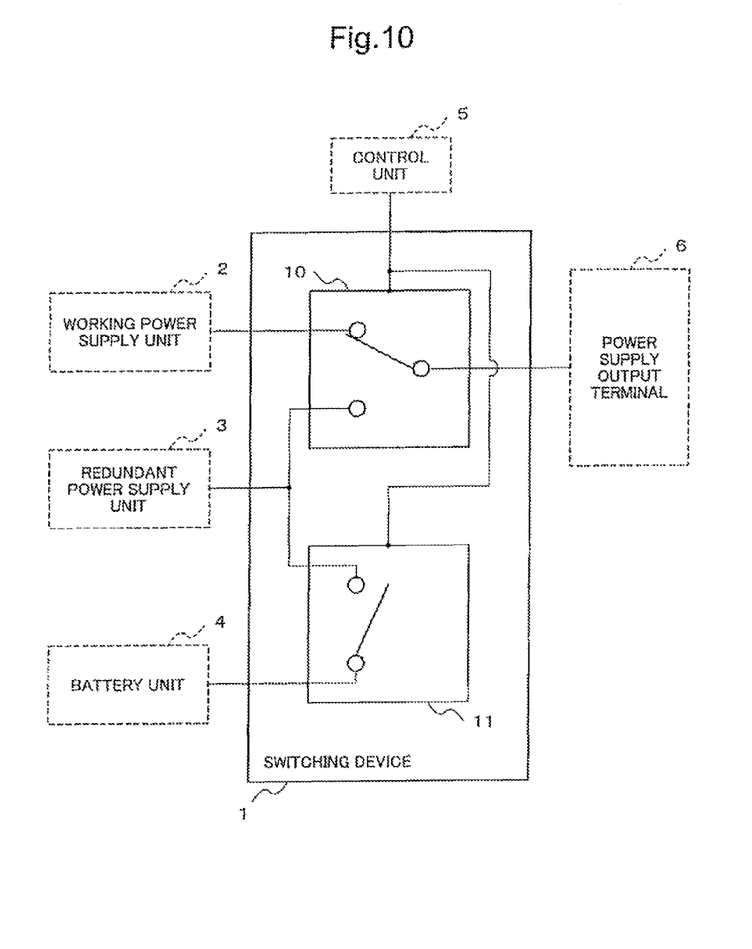
FIG. 10 is a figure illustrating an example of a switching device 1 in a normal state.

FIG. 10 is a figure illustrating an example of the normal state of the switching device 1 of FIG. 3. The selector switch 10 of FIG. 10 connects the working power supply unit 2 and the power supply output terminal 6 and cuts a connection between the redundant power supply unit 3 and the power supply output terminal 6. Also, the switch 11 cuts a connection between the redundant power supply unit 3 and the battery unit 4.

Next, the control unit 5 detects a state of the working power supply unit 2 (Step S22).

When the control unit 5 does not detect abnormality of the working power supply unit 2 (Step S23, N), the control unit 5 detects a state of charge of the battery unit 4 (Step S28).

In case charge completion of the battery unit 4 is detected (Step S29, Y), the control unit 5 switches switching device 1 to the normal state (Step S30) and processing completes.

In case the control unit 5 does not detect charge completion of the battery unit 4 (Step S29, N), processing returns to Step S22.

In case the control unit 5 detects abnormality in the working power supply unit 2 (Step S23, Y), the control unit 5 switches the switching device 1 to a spare charging state (Step S24). The spare charging state is the state where both the redundant power supply unit 3 and the power supply output terminal 6, and the redundant power supply unit 3 and the battery unit 4 are connected.

Figure 11:
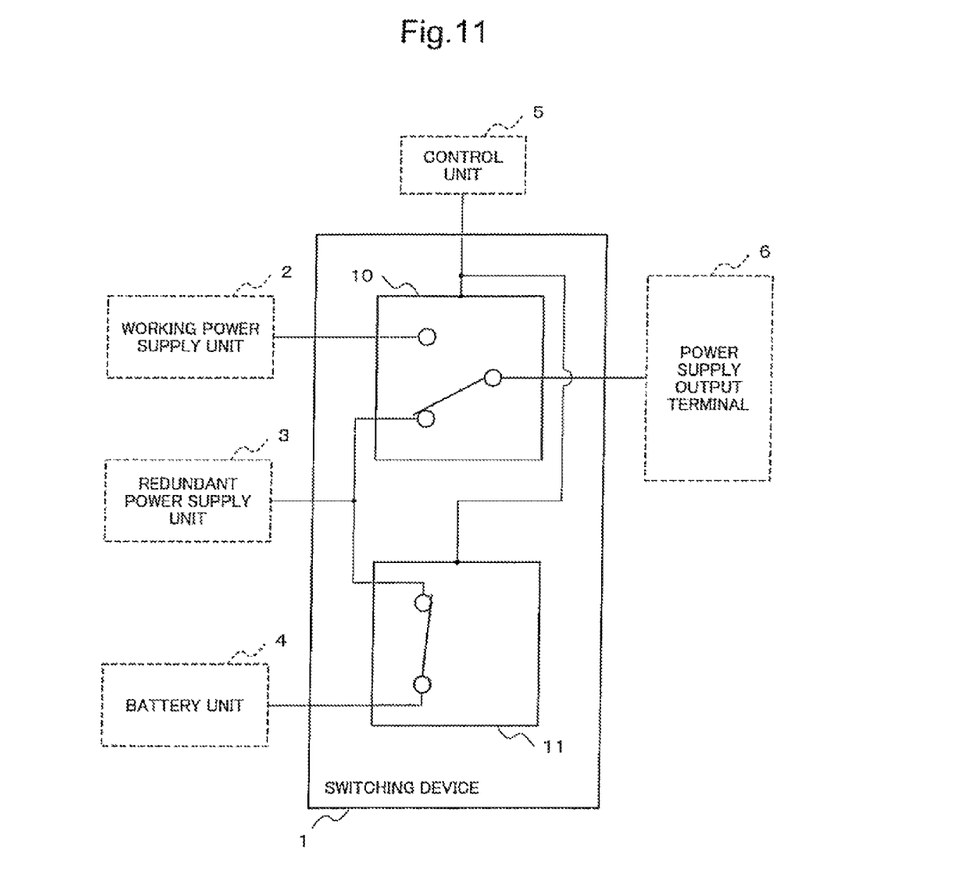
FIG. 11 is a figure illustrating an example of a switching device 1 in a spare charging state.

FIG. 11 is a figure illustrating an example of the spare charging state of the switching device 1 of FIG. 3. The selector switch 10 of FIG. 10 cuts a connection between the working power supply unit 2 and the power supply output terminal 6 and connects the redundant power supply unit 3 and the power supply output terminal 6. Also, the switch 11 connects the redundant power supply unit 3 and the battery unit 4.

Further, the control unit 5 may switch the switching device 1 once to the spare state before Step S24. And in case it is confirmed that electric power which the redundant power supply unit 3 supplies is enough to supply both of the computer device 7 and the battery unit 4, the control unit 5 may switch the switching device 1 to the spare charging state. In this case, the control unit 5 may confirm whether electric power which the redundant power supply unit 3 supplies is enough or not based on the value inputted in advance which indicates the electric power the redundant power supply unit 3 can supply, and electric power which the computer device 7 and the battery unit 4 require. Further, the spare state of this exemplary embodiment is same as the spare state of the first exemplary embodiment.

Next, the control unit 5 detects a state of charging of the battery unit 4 (Step S25). In case charging of the battery unit 4 is not completed (Step S26, N), processing returns to Step S24.

In case charging of the battery unit 4 is completed (Step S26, Y), the control unit 5 switches the switching device 1 to the spare state (Step S27).

In this exemplary embodiment described above, there is the effect, in addition to the effect of the first exemplary embodiment, that even when abnormality has occurred in the working power supply unit 2, the battery unit 4 can be charged.

The reason is that the switching device 1 of this exemplary embodiment can be switched from the initial state mentioned above to the spare charging state in which both of the power supply output terminal 6 and the battery unit 4 are connected with the redundant power supply unit 3. In case abnormality is detected in the working power supply unit 2 while the battery unit 4 is being charged, by switching the switching device 1 from the initial state to the spare charging state, even when abnormality is detected in the working power supply unit 2, charging of the battery unit 4 becomes possible.

In the example indicated in the exemplary embodiment of the present invention, the power supply device supplies electric power to the computer device 7 connected to the power supply output terminal 6. However, a device which the power supply device of the present invention supplies electric power is not limited to a computer device. The present invention is also applicable to a device other than the computer device.

The control unit 5 of the present invention can be realized by hardware such as a circuit, a computer controlled by a program or their combination.

While the invention has been particularly shown and described with reference to exemplary embodiments thereof, the invention is not limited to these embodiments. It will be understood by those of ordinary skill in the art that various changes in form and details may be made therein without departing from the sprit and scope of the present invention as defined by the claims.

The invention claimed is:

1. A switching device comprising connectors and switching part, which is connected via the connectors to a working power supply unit, a redundant power supply unit, a battery unit and a power supply output terminal, and,
   in an initial state, connects the power supply output terminal and the working power supply unit ,and connects the battery unit and the redundant power supply unit, and
   in a spare state, cuts a connection between the battery unit and the redundant power supply unit, and connects the power supply output terminal and the redundant power supply unit.

2. The switching device according to claim 1, wherein the switching part includes: a first switch which connects the working power supply unit and the power supply output terminal, and a first selector switch which connects the redundant power supply unit and either the power supply output terminal or the battery unit, wherein
   in the initial state, the first switch connects between the working power supply unit and the power supply output terminal, and the first selector switch connects between the redundant power supply unit and the battery unit and cut a connection between the redundant power supply unit and the power supply output terminal, and
   in the spare state, the first switch cuts a connection between the working power supply unit and the power supply output terminal, and the first selector switch cut a connection between the redundant power supply unit and the battery unit and connects between the redundant power supply unit and the power supply output terminal.

3. The switching device according to claim 1 wherein the switching part includes: a second selector switch which connects either the working power supply unit or the redundant power supply unit and the power supply output terminal, and a second switch which connects the redundant power supply unit and the battery unit, wherein
   in the initial state, the second selector switch connects between the working power supply unit and the power supply output terminal and cuts a connection between the redundant power supply unit and the power supply output terminal, and the second switch connects between the redundant power supply unit and the battery unit, and
   in the spare state, the second selector switch cuts a connection between the working power supply unit and the power supply output terminal and connects between the redundant power supply unit and the power supply output terminal, and the second switch cuts a connection between the redundant power supply unit and the battery unit.

4. A power supply device comprising: the switching device according to claim 1, and
   a control unit which is connected to the working power supply unit and the switching device, and when abnormality of the working power supply unit is detected, outputs to the switching device a switching direction which causes the switching device to change its state from the initial state to the spare state.

5. The power supply device according to claim 4 further comprising: the working power supply unit, the redundant power supply unit and the battery unit.

6. A computer system comprising: the power supply device according to claim 4, and a computer device connected to the power supply device.

7. A power controlling method which, based on voltage of the working power supply unit measured by a voltage sensor, detects abnormality of the working power supply unit, and outputs to the switching device according to claim 1 a switching direction which causes the switching device to change its state from the initial state to the spare state.

8. A non-transitory computer readable medium embodying a power supply controlling program which makes a computer connected to the switching device according to claim 1 and the working power supply unit operate
   as a control unit which, when abnormality of the working power supply unit is detected, outputs to the switching device a switching direction which causes the switching device to change its state from the initial state to the spare state.

9. The switching device according to claim 1, wherein the redundant power supply unit charges the battery in the initial state.

* * * * *